June 5, 1951  A. SCHNEIDER  2,555,662
SELF-LOCKING SCREW
Filed Sept. 3, 1948
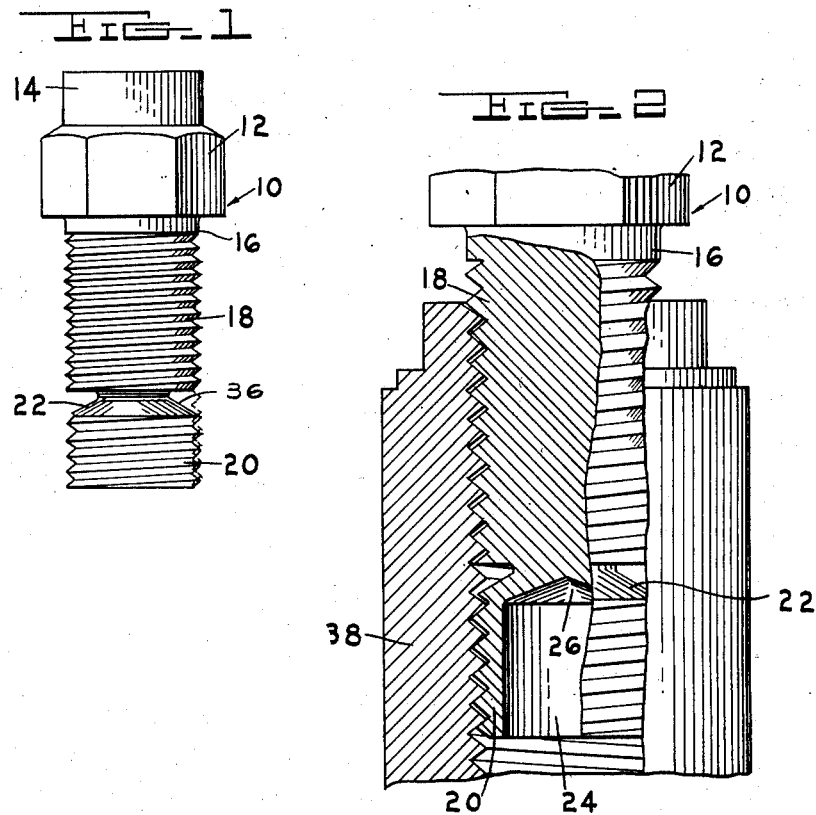
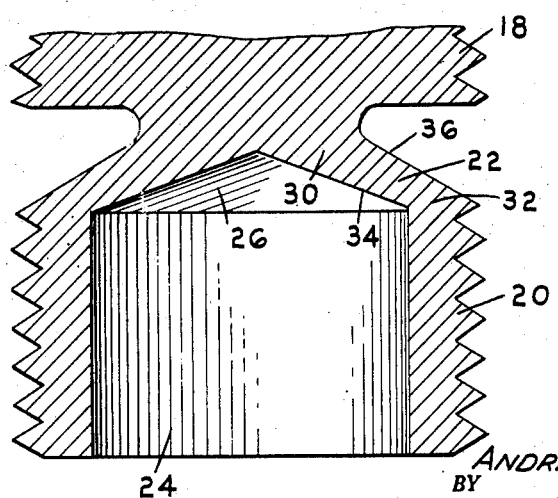
INVENTOR.
ANDREW SCHNEIDER
BY
McDonald & Shayne
ATTORNEYS Patented June 5, 1951

2,555,662

UNITED STATES PATENT OFFICE 2,555,662

SELF-LOCKING SCREW

Andrew Schneider, Saginaw, Mich., assignor to Eaton Manufacturing Company, Cleveland, Ohio, a corporation of Ohio Application September 3, 1948, Serial No. 47,685

2 Claims. (Cl. 151—32)

This invention relates to locking screws and more particularly to self-locking adjustment screws.

Broadly the invention comprehends the provision of a locking screw having means integrally structurally incorporated therein providing for their self-locking with relation to an internally threaded member. The screw comprises generally a pair of threaded sections of like pitch diameter wherein the lead of one section is axially offset a predetermined distance to the other section and having a resilient unthreaded diaphragm section between the threaded sections of specific configuration and dimensions.

An object of the invention is the provision of a self-locking screw of simple and economical construction and which is effective in use.

Another object of the invention is the provision of self-locking screws comprising a pair of axially spaced equal pitch diameter sections, the head of the thread of one section being axially offset to the other and a conical diaphragm section connecting the threaded sections effective to provide a resilient holding force for the screw in adjusted position relative to an internally threaded member in which it is adapted to be received.

A further object of the invention is the provision of a self-locking screw comprising a pair of axially spaced threaded sections, the lead of the thread of one section being axially offset to the other and having a tublular conical section integrally arranged therebetween that possesses resilient qualities lending themselves to the repeated adjustment of the screw without appreciable loss of torque holding capacity.

A yet further object of the invention is the provision of a self-locking screw comprising a pair of threaded sections, the lead of the thread of one section being predeterminedly offset to the other section and a resilient conical cross-sectional shaped section joining the threaded sections together, wherein the threads are rolled upon the threaded sections lead offset to one another and wherein the conical section affords proper resiliency for an effective torque holding quality of the screw.

Other objects and advantages of the invention will appear from the following description taken in conection with the drawings, forming a part of the specification; and in which:

Fig. 1 is a side elevational view of a self-locking screw;

Fig. 2 is a partially broken, partially cross-sectional vertical view of the self-locking screw of Fig. 1 and its associated receiving member; and Fig. 3 is a fragmentary enlarged sectional view of the diaphragm section of the locking screw.

The presently devised locking screw was made for the purpose of providing a self-locking screw that is simple of structure and which can be easily and economically manufactured and which is effective in its use.

The screw as herein devised comprises a pair of equal pitch diameter axially spaced threaded sections, the lead of the thread on one section being offset axially to the lead of the thread on the other sections and a cone-shaped tubular section integrally interconnected between the sections of sufficient strength and resiliency to afford torque holding means for the screw in its operational use such as a self-locking adjustment screw for valve tappets and the like. In the use of the conical section as a diaphragm element between the two threaded sections the wall thickness, and angular displacement relative to the threaded sections and the axes thereof were major factors in the determination of the precise cross-sectional configuration the diaphragm required to have to provide the screw with ample torque holding quality within prescribed limits and one which could be adjusted repeatedly in use without an appreciable loss of torque holding quality. Further, through the use of the conical diaphragm, it permits of the feasible thread rolling of the threaded sections with the lead mismatch incorporated in the rolling operation thereby eliminating the requirement for any additional work steps to obtain a proper mismatch as might be desired or required.

Referring to the drawings for more specific details of the invention, 10 represents generally a self-locking adjustment screw of the type for conventional use with engine tappets, comprising a hexagonal head portion 12 which has its upper end 14 formed to provide a bearing surface adapted to be engaged by mechanism such as a valve, not shown, and a shank 16 extending axially from the head portion.

The shank 16 of the screw includes a pair of axially spaced equal pitch diameter threaded sections 18 and 20 integrally connected together by an unthreaded section 22 concentrically arranged therewith. The lead of the thread on section 20 is axially offset to the lead of the thread on section 18 by a predetermined amount, the purpose of which will hereinafter appear.

The threaded sections 20 of the screw is provided with an axial bore 24 extending from the free extremity of the screw, axially disposed from the head 12, substantially throughout the length of the threaded section and terminating in a taper 26 extending into section 22.

The screw 10 is provided with an annular groove 28 of predetermined shape between the threaded sections, so as to provide in conjunction with taper 26 section 22 of conical shape. The wall of section 22 is preferably tapered down from the inner diameter of the section at 30 toward the threaded portion of section 20 at 32 and this is predeterminedly achieved by machining the inner wall 34 of section 22 at an angle of substantially 20° to a plane passing perpendicular to the axis of the screw and outer wall 36 at an angle of substantially 30° to the same plane.

The section 22 in being provided a conical shape as hereinbefore defined serves as a resilient diaphragm between the threaded sections 18 and 20 thereby affording a satisfactory elastic return, a long plastic region and a good torque range for the screw in its utilization as a self-locking adjustment screw. The section is preferably tapered down from 32 to 34 so as to afford ample resiliency and elasticity without chance of rupture through the section due to the axial deformation taking place therein when the screw is threaded for locking relation into an internally threaded member 38 of substantially equal pitch diameter and constant lead throughout its threaded portion.

The threads on the threaded sections 18 and 20 are desirably rolled thereon with the predetermined mismatch provided between the sections thereby positively establishing the desired mismatch at no load deflection of the diaphragm section 22 such that with the proper determination of desired torque holding qualities for a standard screw a permissible torque range can be obtained even accounting for variations in machining inaccuracies of the screw and internally threaded member adapted to be associated therewith.

The mismatch between the sections is made either negative or positive depending upon the required tensile or compressive holding application of the screw.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. An integral self-locking screw having a shank, said shank provided intermediate its ends with an annular circumferentially continuous groove having radially inwardly convergent walls and defining axially spaced inner and outer shank portions, said outer shank portion provided with a central bore having a conical inner end wall, said groove extending radially inwardly beyond the outer cylindrical wall of the bore, both the end wall of the bore and the adjacent wall of said groove converging in the direction of said inner shank portion and said walls collectively defining a longitudinally flexible and resilient annular diaphragm which slopes at a substantial angle radially inwardly and axially toward said inner shank portion, said diaphragm diminishing in thickness toward the periphery of the screw and permitting relative axial movement between said inner and outer shank portions, an external rolled screw thread formed on said inner shank portion, an external rolled screw thread formed on said outer shank portion in mismatched relation with respect to the thread on said inner shank portion and offset in the direction of said inner shank portion a distance equal to a minor portion of the lead of a thread.

2. An integral self-locking screw having a shank, said shank provided intermediate its ends with an annular circumferentially continuous groove having radially inwardly convergent walls and defining axially spaced inner and outer shank portions, said outer shank portion provided with a central bore having a conical inner end wall, said groove extending radially inwardly beyond the outer cylindrical wall of the bore, both the end wall of the bore and the adjacent wall of said groove converging in the direction of said inner shank portion, said bore extending to such a depth that a substantial portion of the cone defined by said end wall lies in a transverse plane common to that of said groove and said walls collectively defining a longitudinally flexible and resilient annular diaphragm which slopes at a substantial angle radially inwardly and axially toward said inner shank portion, said diaphragm permitting relative axial movement between said inner and outer shank portions, an external rolled screw thread formed on said inner shank portion, an external rolled screw thread formed on said outer shank portion in mismatched relation with respect to the thread on said inner shank portion and offset in the direction of said inner portion a distance equal to a minor portion of the lead of a thread.

ANDREW SCHNEIDER.

REFERENCES CITED

The following references are of record in the file of this patent:

UNITED STATES PATENTS

| Number | Name | Date |
| --- | --- | --- |
| Re. 20,542 | Dyer | Oct. 26, 1937 |
| 1,519,126 | Furlan | Dec. 16, 1924 |
| 2,166,686 | Hoern | July 18, 1939 |
| 2,224,659 | Stoll | Dec. 10, 1940 |
| 2,387,375 | Whyland | Oct. 23, 1945 |
| 2,427,560 | Johnson | Sept. 16, 1947 |